(No Model.)

E. H. SMITH.
SAFETY HOOK.

No. 286,739. Patented Oct. 16, 1883.

Witnesses,
Geo. H. Strong.
J. H. House

Inventor
E. H. Smith
By Dewey & Co.
Attorneys

UNITED STATES PATENT OFFICE.

EDWARD H. SMITH, OF RUTHERFORD, CALIFORNIA.

SAFETY-HOOK.

SPECIFICATION forming part of Letters Patent No. 286,739, dated October 16, 1883.

Application filed July 13, 1883. (No model.)

*To all whom it may concern:*

Be it known that I, EDWARD H. SMITH, of Rutherford, county of Napa, and State of California, have invented an Improvement in Safety-Hooks; and I hereby declare the following to be a full, clear, and exact description thereof.

My invention relates to a novel hook which may be opened to connect or attach to any object, and afterward closed, so as to prevent its becoming detached, as will be more fully explained by reference to the accompanying drawings, in which—

Figure 1:
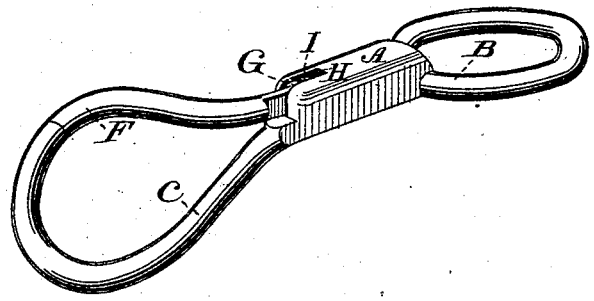
Figure 2:
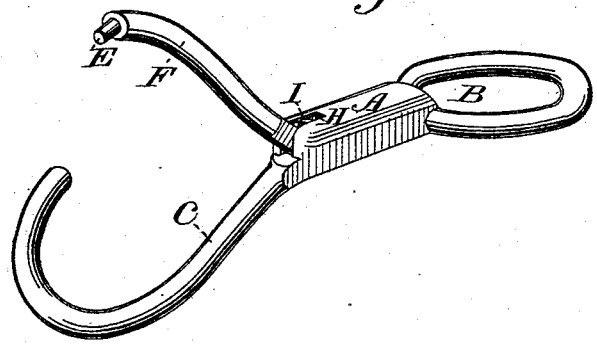
Figure 4:
Figure 3:
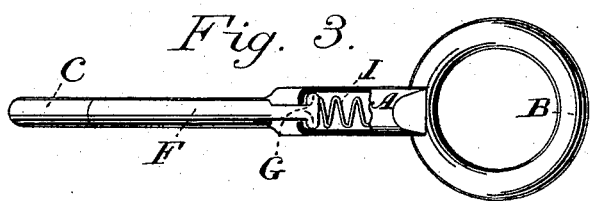

Figure 1 is a view of the hook closed. Fig. 2 is a view of the hook open. Fig. 3 is a plan, a portion of the shank A being broken away in order to show spring I and the lugs G. Fig. 4 is a view showing the hole D in the hook C.

A is the shank of my hook, having a ring, swivel, or other suitable connecting device at B. The curved portion C, which forms the hook, is made much shorter at the point than is usual with hooks, so that, when open, it is easily atttached or detached.

The end of the hook is squared, and has a hole, D, made in it to receive the point E of the closing or safety portion of the hook F. The upper end of this portion has projecting lugs G, which form a sort of T-head, and the shank A has a slot, H, formed longitudinally within it, in which these lugs may slide, so as to allow the point E to be withdrawn from the hole D, after which it may be turned back, the lugs acting as a hinge upon which it turns.

In order to keep the part F forward, so as to return the point E in the hole D and prevent its being disengaged by accident, a spring, I, is fitted into the slot H, so as to press against the rear portion of the part F, and thus force it forward. When it is to be unlatched and turned back to open the hook, it is forced back, compressing the spring until the point E is released, when the arm F may be turned back and the hook opened. When closed and locked, it forms a continuous hoop with smooth sides and no projections to catch. It is not liable to open accidentally, and that part of the hook upon which the strain comes is long enough for its work, but so short as to be easily attached or detached when open.

Having thus described my invention, what I claim as new, and desire to secure by Letters Patent, is—

1. The hook C, having a slotted shank, A, and the closing supplemental short arm F, fitted to enter a socket in the hook, and having its opposite end provided with a T-shaped head to slide in the slot in the shank, substantially as herein described.

2. A safety-hook consisting of a longitudinally-slotted shank, A, and a curved hook portion, C, perforated at its outer end to receive the point of the supplemental short arm F, the rear end of which is provided with a T-shaped head to fit the slot in the shank, in combination with a spring acting against the rear of the part F, substantially as herein described.

In witness whereof I have hereunto set my hand.

EDWARD H. SMITH.

Witnesses:
S. H. NOURSE,
HENRY C. LEE.